United States Patent [19]

Huber

[11] Patent Number: 4,950,112
[45] Date of Patent: Aug. 21, 1990

[54] MACHINE FOR THE PRECISION WORKING OF THE TOOTH FLANKS OF TOOTHED WORKPIECES

[75] Inventor: Manfred Huber, Munich, Fed. Rep. of Germany

[73] Assignee: Carl Hurth Maschinen- und Zahnradfabrik GmbH & Co., Munich, Fed. Rep. of Germany

[21] Appl. No.: 376,856

[22] Filed: Jul. 7, 1989

[30] Foreign Application Priority Data

Sep. 28, 1988 [DE] Fed. Rep. of Germany ... 8812273[U]

[51] Int. Cl.$^5$ .............................................. B23F 19/06
[52] U.S. Cl. ......................................... 409/32; 51/32; 51/52 R; 409/37; 409/49
[58] Field of Search .................. 409/31, 32, 33, 34, 409/36, 37, 49; 51/32, 52 R; 72/74, 101, 102

[56] References Cited

U.S. PATENT DOCUMENTS 2,762,268  9/1956  Maurer .................................. 409/33

OTHER PUBLICATIONS

Webster's Third New International Dictionary of the English Language, Sand C. Merriam Company, 1961, pp. 364 and 1640.

Primary Examiner—Daniel W. Howell
Attorney, Agent, or Firm—Flynn, Thiel, Boutell, & Tanis

[57] ABSTRACT

A machine for the precision working of the tooth flanks of toothed workpieces with a gearlike tool, for example, a shaving gear or the like, which is in a two-flank generating engagement with a workpiece. The workpiece is supported stationarily, however, rotatably on a machine bed and the tool is mounted on a tool head arranged rotationally adjustably about an adjusting axis directed perpendicularly with respect to the tool axis and with respect to the workpiece axis and in a rockable slide member pivotal about a horizontal axis on a cross slide movable in a horizontal direction. The cross slide is guided in a feed slide which is also movable in a horizontal direction. The two directions of movement are offset at 90°. The feed slide is guided in a feed carriage movable in a vertical direction.

10 Claims, 2 Drawing Sheets

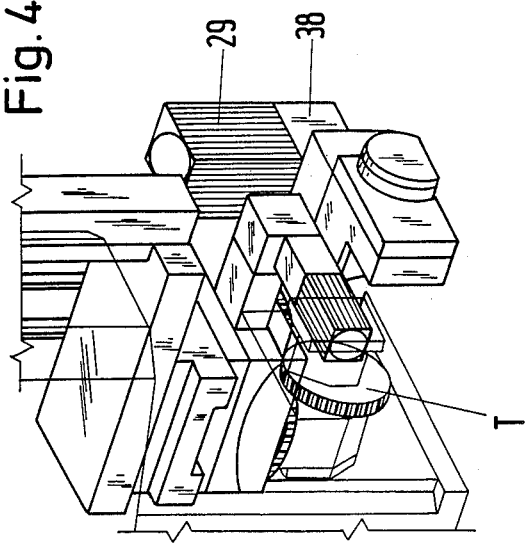
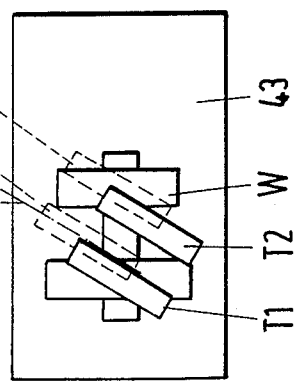
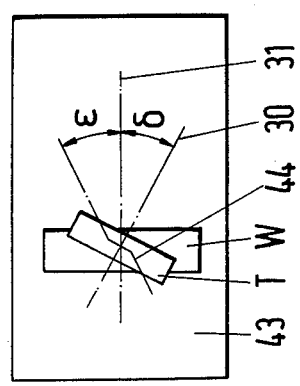
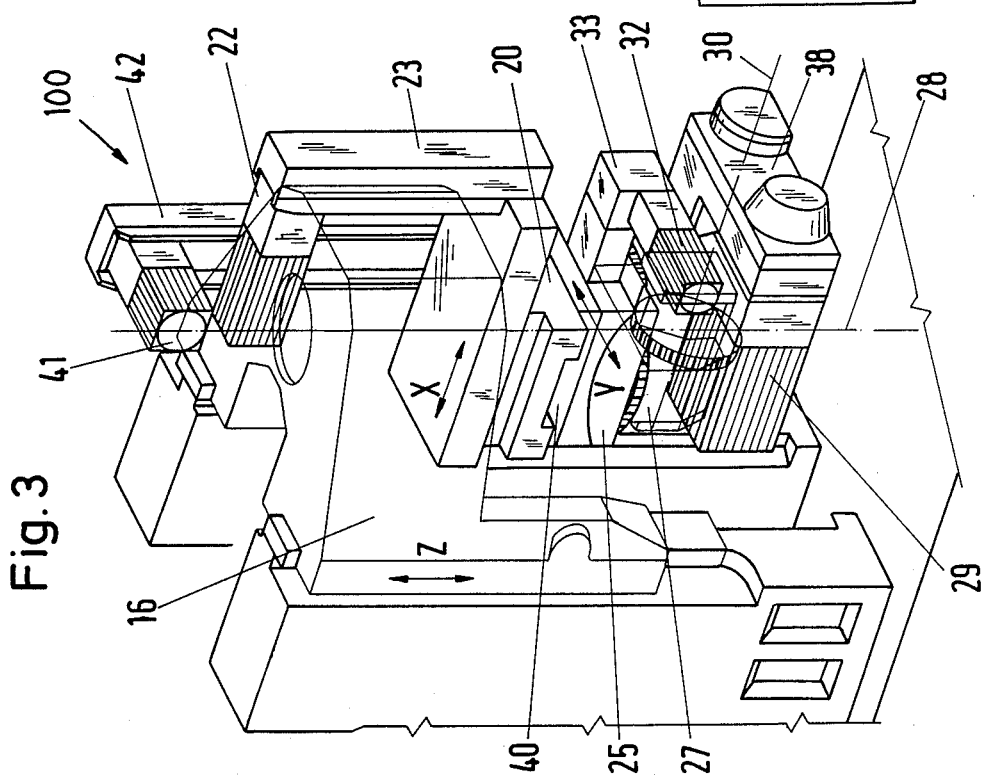

MACHINE FOR THE PRECISION WORKING OF THE TOOTH FLANKS OF TOOTHED WORKPIECES

FIELD OF THE INVENTION

The invention relates to a machine for the precision working of the tooth flanks of toothed workpieces with a gearlike tool.

BACKGROUND OF THE INVENTION

A machine of the mentioned type is known from German OS No. 31 42 843 (which corresponds to U.S. Pat. No. 4 545 708). This type of construction makes it possible to assign during finishing, rolling, honing, etc., a specific center distance and a specific pivot or plunge angle for each point on a flank contour of the gear to be machined. The specific center distance and specific pivot or plunge angle can be adjusted as needed. It is possible in this manner to produce almost any desired shape of flank contour, namely, independent of the shape of the tool-tooth flanks. Machining can be done on the known machine both according to the parallel method and also according to the diagonal and underpass or according to the plunge method. It has been considered to be disadvantageous at times the movement of the feed carriage and the pivoting movement of hte rockable slide p member can be controlled independently from one another, however, in dependency of the respective position of the feed slide. This limits the possibilities influencing a correction. Also in practice it happens again and again that a transition from one method to another method during the machining task would be advantageous, for example, in order to achieve a desired flank shape or flank correction or in order to "wipe out" machining marks or for other reasons. Such a transition is only conditionally possible in the iknown machine. Hampering this transition are in particular the necessary turning of the feed slide (during the transition, for example from the parallel to the diagonal method) and the device described in German OS No. 34 10 686 (which corresponds to U.S. Pat. No. 4 575 289), with which holds the feed slide in its respectively adjusted angular position relative to he machine frame or to the feed carriage.

Therefore, the basic purpose of the invention is to further develop the machine such that its range of application can be increased. and this is accomplished by providing a cross stroke. In particular, any desired transition from one method to another is now possible without requiring complicated control mechanism to do so. Also the possibility of influencing a correction is to exist.

Due to the fact that the tool can, in the inventive machine, be moved by means of the feed slide and a cross slide in two perpendicularly related directions relative to the workpiece, each point, which can be reached by the tool within the operating range, can be defined in a simple and reliable manner as a point of intersection of two coordinates. The up to now necessary conversion of angle measurements is no longer needed since the feed slide is no longer rotatably arranged on the feed carriage, but can be moved only in one direction. Thus, all movements have become freely programmable, which substantially simplifies both the control for achievement of a movement toward all necessary points on the respectively desired flank contour and also the corresponding programming. Further, a transition from one method to another one during machining is possible.

Due to the arrangement of the cross slide on the feed slide, it is possible, as has already been mentioned, to reach each point within the operating range of the machine. Thus, it is no longer necessary, as had been in the past, to chuck the workpiece exactly centrally with respect to the axis of rotation of the tool head, thus substantially eliminating the complicated movement of the tailstock on the machine bed and also an exact adjustment of the clamping mechanisms. The tool can now be moved to the workpiece center and all preprogrammed machining movements start out from this point.

Workpieces with several tooth systems thus can be machined in one setting or at least in fewer settings than has been possible up to now, since each tool can be guided to the tooth system for machining purposes, which is not possible in the case of the machine according to the state of the art.

The arrangement of the motor for the rotary drive of the tool laterally on the tool head, which arrangement is known from the aforementioned German OS No. 31 42 843, can, due to the uneven weight distribution, result in shortcomings in the area of the rockable slide member or its adjusting drive. An arrangement of the motor in front of or behind the tool and with an axis parallel to the axis of the tool results in an almost ideal weight distribution. This arrangement can at times create problems because of an insufficient free movement of the workpiece: if machining is done in the plunge method, the motor does not interfere; however, it can be in the way, when—which must be possible without limitations for the desired increased range of application—machining is done according to the diagonal or according to the underpass method. Also the loading and unloading of the workpiece is possibly considerably influenced by a motor positioned in front of or behind the tool. A center-distance increase between tool and workpiece, only in order to permit the loading, is time consuming and is therefore supposed to be avoided.

BRIEF DESCRIPTION OF THE DRAWINGS

The invention will be described hereinbelow with reference to exemplary embodiment illustrated in six figures, of which:

FIG. 3 is a perspective view of an important part of the machine;

FIG. 4 is a fragmentary section of a modified form of FIG. 3;

FIG. 5 is a schematic illustration of the operating range; and

FIG. 6 is a similar illustration as FIG. 5 for a machine equipped with two tools.

DETAILED DESCRIPTION

Figure 1:
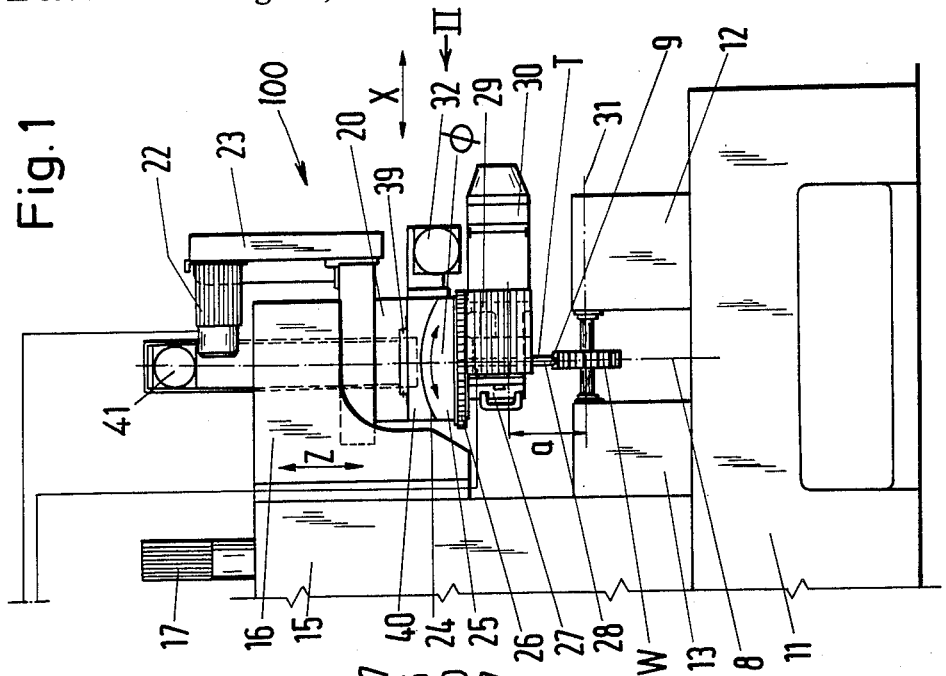
FIG. 1 is a side view of the inventive machine.
Figure 2:
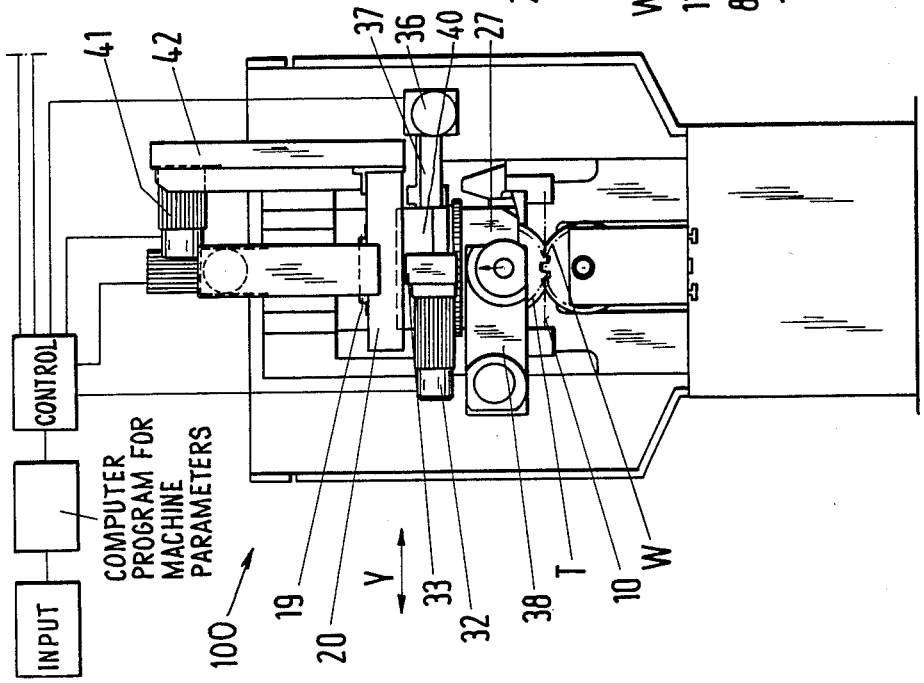
FIG. 2 is a front view of the machine (in direction of the arrow II according to FIG. 1)

FIGS. 1 to 3 illustrate three different views of a gear-finishing machine 100 according to the invention. The toothed workpiece W, which is to be shaved, is received for rotatable movement between tailstocks 12, 13 on a bed 11 of the machine. A feed carriage 16 is vertically movable (in direction of the arrow Z) on a vertically upright column 15 and can be driven for such movement by a motor 17 and a spindle drive (not illustrated). A feed slide 20 is supported for movement back and forth parallel with respect to a workpiece axis 31 (extending parallel to the arrow direction X) in a longitudinal guide 19, for which purpose a motor 22 with a drive transmission 23 is provided.

A cross slide 40 is supported for movement back and forth (in direction of the arrow Y) in a second longitudinal guide 39, which guide is offset at 90° with respect to the longitudinal guide 19, on the feed slide 20. A motor 41 with a drive transmission 42 is provided for this movement.

A rockable slide member 25 is arranged in an arched guide 24 on the underside of the cross slide 40. A tool head 27 is supported for an indexasble or adjustable rotational movement about a vertical axis 28 in a circular guide 26 on the underside of the rockable slide member 2. A gearlike tool T is supported for rotatable movement in the tool head 27, which tool T can be driven through a drive transmission 38 by a motor 29. The tool T can be a grooved shaving gear, a hard-finishing gear coated with CBN or diamond granules, a honing gear or also a rolling gear. The vertically upright axis of rotation 28 of the tool head 27 lies, at the start of each machining operation, preferably (however, not necessarily) in the center plane o rotation 8 of the tool.

The motor 29 can in the position shown in FIG. 3 be hampering for some operating sequences. FIG. 4 shows a different vertical arrangement of the motor 29, in which the access to the workpiece (not shown here) under the tool T is not obstructed or, and in other words, there always exists sufficient free space around workpiece.

By rotating the tool head 27 about the axis 28, for which purpose a motor 36 with a drive transmission 37 is provided, a crossed-axes angle δ is adjusted between the axis 30 of the tool T and the workpiece axis 31. The axes 30 and 31 lie thereby in planes which are parallel to one another. By suitably movably adjusting the movement of the feed slide 20 in the X direction and the movement of the cross slide 40 in the Y direction, the feed direction of the tool T is adjusted, if machining is to be done according to the diagonal method (the feed direction lies then inclined at a feed angle ε with respect to the perspective plane of FIGS. 1 and 2). When machining is to be done in the parallel method, the cross slide 40 is not moved, namely, the only feed occurs in the X direction as shown in the perspective plane of FIG. 1. When machining is to be done in the underpass method, the feed slide 20 is not moved, namely, the only feed occurs in the Y direction as shown in the perspective plane of FIG. 2. In case machining is to be done in the plunge method, then neither the feed slide 20 nor the cross slide 40 are moved. Instead, only the feed carriage 16 is moved, so that only a feed movement in the Z direction occurs, namely, in the sense of a change in the center distance a.

The rockable slide member 25 with the tool head 27 and the tool T are pivotal about an axis 10 in the arched guide 24. A motor 32 with a drive transmission 33 is provided for effecting the pivoting movement φ. In order to avoid undesired cuts on the teeth of the workpiece W and related damage to the teeth of the tool T, it is advantageous that the center plane of rotation 8 of the tool T is always positioned perpendicularly with respect to the flank contour in the respective point of contact 9. The axis 10 for the pivoting movement φ extends therefore through the vertex point of the center plane of rotation 8, which vertex faces or points toward the workpiece W.

In order for the tool T to be able to follow the desired form of the flank contour, each point of the flank contour is associated, aside from a point of intersection defined by the crossing of the coordinates in the X and Y direction, with a specific center distance a and a specific angle of traverse or plunge angle φ. The movements of the tool T are determined in the easiest manner by using the path to be described from one point on the outside diameter of the tool and are fed to the machine control, a NC-control, through a computer program determining the machine parameters. The NC-control then synchronizes the movements X, Y, Z and φ and also δ.

The tool T and the workpiece W are during each machining operation, like shaving, honing, etc., in a two-flank generating engagement. Aside from the pure plunge feed, the tool T always carries out at least one back and forth feed movement in a plane defined by the coordinates X and Y. If crowned tooth flanks are to be produced on the workpiece W, the tool T must, in order for the two-flank generating engagement to be maintained over the entire width of the tooth or rather in order to be able to actually produce the desired flank contour, carry out during the feed movement a pivoting movement (in the direction of the arrow φ), which causes a change of the center distance a.

As already mentioned, the various movements can occur independently from one another, their reciprocal dependency is only effected by a suitable programming of the control. Thus, practically all corrections in the flank contour can be extensively realized. In addition, it is possible through suitable programming to, for example, change the diagonal angle during a machining sequence or to change from one machining method (for example from the diagonal finishing) to another one (for example to the underpass method). Such changes can thereby take place at a freely selectable point of the feed path. A continuous transition is also possible.

The aforedescribed machine can also be utilized to produce, according to the same method, conical and conically crowned tooth flanks. A simultaneous movement of the tool T both in the Z and also in the X and-/or Y direction is then necessary in both cases. This composed movement additionally has for conically crowned tooth flanks the pivoting movement (in the direction of the arrow φ) superposed.

FIG. 5 schematically illustrates the operating range 43 of the tool T. It can be seen that the tooth system of a workpiece W does not always have to be at a pregiven point, but that it can be reached driven to any desired point by the tool T. The line 44 shows for example how the movement of the tool T in the X-Y plane can be changed during the machining of the workpiece W.

FIG. 6 schematically illustrates a workpiece W with two tooth systems, of which the one is machined with a tool T1 (solid lines), while a second tool T2 is functionless. Both tools T1, T2 are received in the tool head 27. The tool head 27 is subsequently moved such that the other tooth system of the workpiece is machined with the tool T2 (broken lines), while the first tool T1 is functionless. One must consider in such cases that the pivot axis 10 extends only through the center plane of rotation 8 of the tool T1, however, not through the center plane of rotation of the tool T2. During a possibly needed pivoting movement of the tool T2, the undesired feeding connected therewith must be compensated for by suitably changing the center distance a.

The design of the inventive machine is not to be limited to the existing example. It is true that the stationary arrangement of the workpiece on the machine bed offers a significant advantage with respect to stiffness and loading possibilities compared with other known types of construction. In spite of this, it is possible to arrange, for example, the tool and the workpiece instead of one above the other also side-by-side with horizontal or vertical axes. Another advantage of the concept embodied in the machine, namely, that the radial machining forces can be directly opposed by a large-surface guide in the form of the rockable slide member, and that only the axial forces, opposed by the structural parts necessary for facilitating the rotary adjustment of the tool head, can thereby be maintained. The drive mechanisms for the various movements are thereby not to be limited to the described and illustrated embodiments and arrangements, which is to be understood by the use of the broad terminology "motor" and "drive transmission".

The embodiments of the invention in which an exclusive property or privilege is claimed are defined as follows:

1. In a machine for the precision working of the tooth flanks of a toothed workpiece with a gearlike took, which tool is in a two-flank engagement with said workpiece, which machine has a machine bed on which is provided a vertically movable feed carriage, said feed carriage having a feed slide and a cross like means mounted thereon for supporting said tool for movement in two orthogonally related directions and orthogonally relative to a direction of movement of said feed carriage, said feed carriage also having a rockable like member mounted thereon, said machine further comprising:
   (a) means for totally and axially stationarily supporting said workpiece on said machine bed,
   (b) a tool head adapted to hold said tool for movement about a tool axis, said tool head being mounted on said rockable slide member and being arranged rotationally adjustably about an adjusting axis extending perpendicularly with respect to said tool axis and with respect to a workpiece axis, said rockable slide member being pivotal guided about a horizontal axis in an arched guide, and
   (c) support means arranged between said rockable slide member and said feed carriage for supporting said feed slide for movement parallel with respect to said workpiece axis,
the improvement wherein:
   (d) said cross slide means includes a cross slide arranged directly under said feed slide, said cross slide having on its underside said arched guide for said guiding of said rockable slide member, said support means including further support means provided between said feed slide and said cross slide for facilitating said cross slide being movable in a direction offset at 90° with respect to the direction of movement of said feed slide, and
   (e) control means are provided for controlling the movements of said feed slide, said cross side and said feed carriage all of said movements being controlled independently from one another.

2. The machine according to claim 1, wherein two or more tools are provided and arranged side-by-side on said tool axis for facilitating a machining of workpieces having two or more tooth systems.

3. The machine according to claim 1, wherein a drive motor and a drive transmission for said tool are arranged on said tool head, and wherein said motor is arranged so that its axis of rotation is parallel to said tool axis and radially next to said tool.

4. The machine according to claim 1, wherein a rotary drive motor and a drive transmission of said tool are arranged on said tool head, and wherein said motor is arranged stationarily and has a vertically upstanding axis of rotation.

5. The machine according to claim 1, wherein further support means and said control means facilitates said feed slide and said cross slide being independently movable in two orthogonally related directions, each orthogonal to said direction of movement of said feed carriage.

6. In a machine for the precision working of the tooth flanks of a toothed workpiece with a gearlike tool, which tool is in a two flank engagement with said workpiece, which machine has a machine bed on which is provided a vertically movable feed carriage, said feed carriage having a feed slide, said machine further comprising:
   (a) means for rotatably and axially stationarily supporting said workpiece on said machine bed,
   (b) a tool head adapted to hold said tool for movement about a tool axis, said tool head being mounted on a rockable slide member and being arranged rotationally adjustably about an adjusting axis extending perpendicularly with respect to said tool axis and with respect to a workpiece axis, said rockable slide member being pivotally guided about a horizontal axis in an arched guide, and
   (c) support means arranged between said rockable slide member and said feed carriage for supporting said feed slide for movement parallel with respect to said workpiece axis,
the improvement wherein:
   (d) under said feed slide there is arranged a cross slide having on its underside said arched guide for said rockable slide member, said cross side being movable in a direction offset at 90° with respect to he direction of movement of said feed slide, and
   (e) control means are provided for controlling the movements of said feed slide, said cross slide and said feed carriage, all of said movements being controlled independently from one another.

7. The machine according to claim 6, wherein two or more tools are provided and arranged side-by-side on said tool axis for facilitating a machining of workpieces having one or more tooth systems.

8. The machine according to claim 6, wherein a drive motor and a drive transmission for said tool are arranged on said tool head, and wherein said motor is arranges so that its axis of rotation is parallel to said tool axis and radially next to said tool.

9. The machine according o claim 6, wherein a rotary drive motor and a drive transmission of said tool are arranged on said tool head, and wherein said motor is arranged stationarily and has a vertically upstanding axis of rotation.

10. The machine according to claim 6, wherein further support means and said control means facilitates said feed slide and said cross slide being independently movable in tow orthogonally related directions, each orthogonal to said direction of movement of said feed carriage.

* * * * *

UNITED STATES PATENT AND TRADEMARK OFFICE
CERTIFICATE OF CORRECTION

PATENT NO. : 4 950 112

DATED : August 21, 1990

INVENTOR(S) : Manfred HUBER

It is certified that error appears in the above-identified patent and that said Letters Patent is hereby corrected as shown below:

Column 5, line 27; change "took," to ---tool,---.

Column 5, line 36; change "like" to ---slide---.

Column 6, line 42; change "side" to ---slide---.

Column 6, line 56; change "arranges" to ---arranged---.

Column 6, line 65; change "tow" to ---two---.

Signed and Sealed this

Tenth Day of March, 1992

Attest:

HARRY F. MANBECK, JR.

*Attesting Officer*  *Commissioner of Patents and Trademarks*